(12) United States Patent
Ruffini et al.

(10) Patent No.: US 10,979,935 B2
(45) Date of Patent: Apr. 13, 2021

(54) METHOD OF CONTROLLING TRAFFIC FLOWS IN A RADIO COMMUNICATIONS NETWORK, REMOTE NODE AND RADIO COMMUNICATIONS NETWORK

(71) Applicant: Telefonaktiebolaget LM Ericsson (publ), Stockholm (SE)

(72) Inventors: Stefano Ruffini, Pisa (IT); Guilio Bottari, Pisa (IT); Paola Iovanna, Pisa (IT); Filippo Ponzini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/466,542

(22) PCT Filed: Dec. 19, 2016

(86) PCT No.: PCT/EP2016/081804
§ 371 (c)(1),
(2) Date: Jun. 4, 2019

(87) PCT Pub. No.: WO2018/113907
PCT Pub. Date: Jun. 28, 2018

(65) Prior Publication Data
US 2020/0084667 A1    Mar. 12, 2020

(51) Int. Cl.
*H04W 28/10* (2009.01)
*H04L 12/801* (2013.01)
(Continued)

(52) U.S. Cl.
CPC ........... *H04W 28/10* (2013.01); *H04L 47/127* (2013.01); *H04L 47/14* (2013.01); *H04L 47/30* (2013.01); *H04L 47/76* (2013.01)

(58) Field of Classification Search
None
See application file for complete search history.

(56) References Cited

U.S. PATENT DOCUMENTS 9,398,489 B1 *   7/2016   Akhter ................. H04W 28/06
9,525,482 B1 * 12/2016   Tse ..................... H04B 10/0795
(Continued)

FOREIGN PATENT DOCUMENTS

JP    4655619 B2      1/2011
WO    2016039673 A1   3/2016

OTHER PUBLICATIONS

Cavaliere, Fabio, et al., "Towards a unified fronthaul-backhaul data plane for 5G The SG-Crosshaul project approach", Computer Standards and Interfaces, vol. 51, Nov. 17, 2016, 56-62.
(Continued)

*Primary Examiner* — Jamaal Henson
(74) *Attorney, Agent, or Firm* — Murphy, Bilak & Homiller, PLLC

(57) ABSTRACT

A method (100) of controlling traffic flows in a radio communications network, the method comprising steps of: receiving (102) at a remote node a plurality of traffic flows transmitted from a plurality of radio units; buffering (104) the traffic flows in a common buffer of the remote node; and causing (106) a control signal to be sent to a baseband unit when a fill level of the common buffer is predicted to go above a maximum fill level within a pre-set time interval, wherein the control signal is configured to cause an adjustment of a radio resource allocation of one of the plurality of radio units to cause a reduction in a data rate of the traffic flow transmitted from said radio unit.

16 Claims, 10 Drawing Sheets

(51) Int. Cl.
*H04L 12/835* (2013.01)
*H04L 12/917* (2013.01)

(56) References Cited

U.S. PATENT DOCUMENTS

| | | | | |
|---|---|---|---|---|
| 9,622,133 | B1* | 4/2017 | Guvenc | H04W 36/20 |
| 2002/0068588 | A1* | 6/2002 | Yoshida | H04L 1/0002 |
| | | | | 455/461 |
| 2006/0126507 | A1 | 6/2006 | Nakayasu | |
| 2007/0153683 | A1* | 7/2007 | McAlpine | H04L 43/00 |
| | | | | 370/229 |
| 2010/0046424 | A1* | 2/2010 | Lunter | H04W 28/10 |
| | | | | 370/328 |
| 2013/0107890 | A1* | 5/2013 | Hyoudou | H04B 7/155 |
| | | | | 370/412 |
| 2014/0286258 | A1* | 9/2014 | Chowdhury | H04L 1/188 |
| | | | | 370/329 |
| 2017/0019811 | A1* | 1/2017 | Parulkar | H04L 41/0654 |
| 2017/0118688 | A1* | 4/2017 | Guvenc | H04W 36/20 |
| 2017/0126574 | A1* | 5/2017 | Goel | H04L 41/0896 |
| 2017/0127318 | A1* | 5/2017 | Goel | H04W 28/0273 |
| 2017/0373890 | A1* | 12/2017 | Fertonani | H04L 27/0002 |

OTHER PUBLICATIONS

Sauter, Martin, "From GSM to LTE-Advanced", Wiley, 2014, pp. 1-458.

Unknown, Author, "LTE; Evolved Universal Terrestrial Radio Access (E-UTRA); Medium Access Control (MAC) protocol specification (3GPP TS 36.321 version 12.5.0 Release 12)", ETSI TS 136 321 V12.5.0, Apr. 2015, pp. 1-79.

Unknown, Author, "LTE; Evolved Universal Terrestrial Radio Access (E-UTRA); Physical layer procedures (3GPP TS 36.213 version 13.1.1 Release 13)", ETSI TS 136 213 V13.0.0, May 2016, pp. 1-328.

* cited by examiner

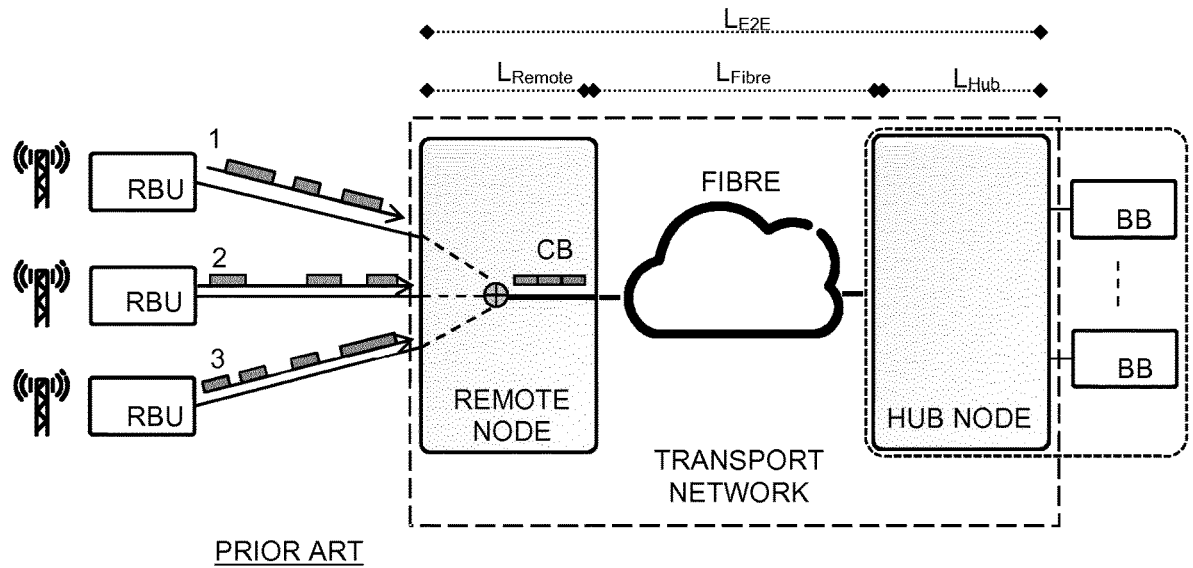

Fig. 1

PRIOR ART

100

102 receive a plurality of traffic flows transmitted from a plurality of radio units at an aggregation node 104 buffer the traffic flows in a common buffer of the aggregation node 106 cause a control signal to be sent to a baseband unit when a fill level of the common buffer is predicted to go above a maximum fill level within a pre-set time interval, wherein the control signal is configured to cause an adjustment of a radio resource allocation of one of the plurality of radio units to cause a reduction in a data rate of the traffic flow transmitted from said radio unit.

102 receive a plurality of traffic flows transmitted from a plurality of radio units at an aggregation node

104 buffer the traffic flows in a common buffer of the aggregation node

152 cause a control signal to be sent to a baseband unit when a fill level of the common buffer is predicted to go above a maximum fill level within a pre-set time interval, wherein the control signal is configured to cause a current modulation format used at a respective radio unit for radio transmission to be changed to a different modulation format having a lower spectral-efficiency than the current modulation format, to cause a reduction in a data rate of the traffic flow transmitted from said radio unit.

102 receive a plurality of traffic flows transmitted from a plurality of radio units at an aggregation node

104 buffer the traffic flows in a common buffer of the aggregation node

162 cause a control signal to be sent to a baseband unit when a fill level of the common buffer is predicted to go above a maximum fill level within a pre-set time interval, wherein the control signal is configured to cause a current number of radio beams used at a respective radio unit for radio transmission to be changed to a lower number of radio beams, to cause a reduction in a data rate of the traffic flow transmitted from said radio unit.

Fig. 8

METHOD OF CONTROLLING TRAFFIC FLOWS IN A RADIO COMMUNICATIONS NETWORK, REMOTE NODE AND RADIO COMMUNICATIONS NETWORK

TECHNICAL FIELD

The invention relates to a method of controlling traffic flows in a radio communications network. The invention further relates to a remote node for a radio communications network and to a radio communications network comprising the remote node.

BACKGROUND

Motivated by the potential significant benefits, radio processing centralization has been advocated by both mobile operators and equipment vendors as it speeds up radio deployment and dramatically reduces network operational costs. However, centralization also comes with its own technological challenges; in particular, very tight latency requirements for links between radio base units, RBU, and baseband units, BB, significantly limit the centralization depth, reducing its benefits.

The transport network is a crucial part of the radio communications network to enable 5G network deployment. Transport will be demanded to support current and next-generation radio access technologies and various schemes of radio functions.

Based on the radio architectures, it is possible to define many radio access network deployment scenarios, ranging from a fully centralized one, CRAN, to the conventional scenario in which all functions are replicated at each radio site, using monolithic radio base stations. However, the evolution towards 5G is characterized by several radio splitting options where the partitioning of radio functions can be distributed in different ways. In this scenario, the same transport network infrastructure should be able to provide fronthaul, backhaul and midhaul interconnection. Fronthaul refers to the interconnection between RBUs and BBs, whatever the radio split is implemented. The fronthaul transmission interface could be the common public radio interface, CPRI, in case of pure CRAN, or packet traffic with very tight latency requirements. Backhaul refers to the interconnection of BBs, whether located in monolithic RBSs or centralized, and the core part of the network. Midhaul refers to the interconnection among BBs, with specific latency requirements. xHaul is a term that has been introduced to indicate a common network and infrastructure integrating both the fronthaul and the backhaul. Several implementations are possible for an xHaul network. For example, a specific xHaul solution can be based on dense wavelength division multiplexing, DWDM, fibre rings connecting a central hub to remote nodes where radio and wireline clients are connected. This solution offers a predictable latency between RBU and BB that it is not possible to achieve using packet switched interfaces such as Ethernet.

In many network scenarios, CPRI connectivity requirements will be insurmountable, especially considering expected 5G requirements such as extreme data rates and massive beamforming, which will feature many more individually-controlled antenna streams. With this limitation in mind, several network scenarios will require a different distribution of radio protocols among the RBUs and the BBs. As a consequence, in these scenarios, the conventional CPRI radio interface will be, in most cases, replaced with a low latency packet interface. This type of interface is expected to be one of the key transport interfaces used to convey data plane, control plane and beamforming parameters for the next generation radio interface compliant with 5G New Radio, NR, but it could be used also for legacy radio access technologies, such as LTE and HSPA.

It is expected that, especially for the NR radio technologies, there will be a maximum edge-to-edge, E2E, tolerated latency, between RBU and BB, of the order of one hundred µs. Referring to FIG. 1, this latency budget can be partitioned into three contributions: the latency added at the remote node, $L_{Remote}$; the latency added during transmission across the optical fibre, $L_{Fibre}$; and the latency added at the hub node, $L_{Hub}$.

The low latency packet interface follows the trend of radio traffic and has a bursty behaviour. In particular, the combined bit rate distribution of three RBUs is sufficiently close to a Gaussian distribution. This has been verified with real measured distributions. The more of these distributions, i.e. more than 3, that are observed at the same time, the more the combined distribution approaches a Gaussian normal distribution. However, a buffering function would be required in the remote node, between the RBUs and BB, to absorb the condition of simultaneous peaks. The larger the buffer, the more robust the system is to traffic loss, but the higher the latency at the remote node is.

Tight latency requirements require use of a small buffer at the output of the remote node. If an RBU generates a peak of traffic for many scheduling events (which each generally last for one transmission time interval, TTI) some losses may occur. In particular, if more traffic peaks occur in the same TTI or last for more than one TTI, a traffic loss is experienced if the output bandwidth of the remote node buffer cannot support the increased traffic rate. Moreover, there is no traffic differentiation based on radio bearers or any other priority mechanism, as the bitrate of any radio base station (RBU plus BB) is only decided on the basis of the quality of its radio channels.

SUMMARY

It is an object to provide an improved method of controlling traffic flows in a radio communications network. It is a further object to provide an improved remote node for a radio communications network. It is a further object to provide an improved radio communications network.

An aspect of the invention provides a method of controlling traffic flows in a radio communications network. The method comprises receiving at a remote node a plurality of traffic flows transmitted from a plurality of radio units. The method additionally comprises buffering the traffic flows in a common buffer of the remote node. The method additionally comprises causing a control signal to be sent to a baseband unit when a fill level of the common buffer is predicted to go above a maximum fill level within a pre-set time interval. The control signal is configured to cause an adjustment of a radio resource allocation of one of the plurality of radio units to cause a reduction in a data rate of the traffic flow transmitted from said radio unit.

This method is based on an interaction between a remote node within the transport network of a radio communications network and a baseband unit, by which radio resource allocation within the radio access network of the radio communications network may be adjusted when the transport resources at the remote node are near to an overflow condition.

The method causes the baseband processing of the radio communications network to downscale radio performances within the radio access network "just enough" to come back to an acceptable rate. The radio service availability may therefore be maximized without overprovisioning the transport network. The method may thereby dynamically prevent the risk of congestion at a remote node of a radio communications network and may avoid packet losses without the need for expensive bandwidth overprovisioning in the transport network infrastructure and without limiting spectrum usage a priori. The method may further stretch operation of a radio communications network at the limit of minimal latency, increasing spectrum usage and removing even potentially rare events, with a faster response. The method may be implemented without requiring modifications to currently deployed radio units.

The method may support resource allocation needs in 5G xHaul networks. When statistical multiplexing is used in order to meet these needs, the congestion avoidance provided by the method may be beneficial to minimize the risk of traffic loss or degradation.

In an embodiment, the method further comprises monitoring a fill level and a fill rate of the common buffer and predicting, based on a current fill level and a current fill rate, whether the fill level will go above the maximum fill level within the pre-set time interval. The method may thereby control traffic flows taking into account the data rates of the traffic flows and the delay introduced by the common buffer.

In an embodiment, causing a control signal to be sent to the baseband unit comprises sending a reallocation request from the remote node to the baseband unit. The reallocation request is configured to cause the adjustment of the radio resource allocation of one of the plurality of radio units.

The method may be based on a direct interaction between a remote node and a baseband unit.

In an embodiment, the method further comprises buffering each of the plurality of traffic flows in a respective input buffer and then outputting each of the plurality of traffic flows from the respective input buffer to the common buffer. The method further comprises monitoring a respective fill level of each input buffer and predicting, based on a current fill level of each input buffer, whether the fill level of the common buffer will go above the maximum fill level within the pre-set time interval. This is useful, in particular, to determine which of the input traffic flows is causing the potential overflow condition at the common buffer.

In an embodiment, the method further comprises, when the fill level of the common buffer is predicted to go above the maximum fill level within the pre-set time interval, identifying which of the traffic flows has caused the fill level of the respective input buffer to go above a preselected threshold fill level. Causing a control signal to be sent to the baseband unit comprises one of causing a reallocation request to be sent from the remote node to the baseband unit and causing a resource allocation feedback signal to be sent to the radio unit from which the said traffic flow is transmitted. The reallocation request is configured to cause an adjustment of the radio resource allocation of the radio unit from which the said traffic flow is transmitted. The resource allocation feedback signal is configured to cause the radio unit to adjust a user equipment parameter for negotiating the radio resource allocation of the radio unit at the baseband unit and to cause the radio unit to send a control plane signal comprising an indication of the user equipment parameter to the baseband unit.

The interaction between the remote node and the baseband unit may therefore be direct or may be via the relevant radio unit. By identifying which of the traffic flows is expected to cause the potential overflow condition at the common buffer, only the radio performance of that radio unit needs to be degraded and the radio performance of the other radio units will not be affected.

In an embodiment, the control plane signal is carried in a medium access control, MAC, layer of the radio communications network. In an embodiment, the control plane signal comprises one of channel quality information, CQI, and a buffer status report, BSR, carried in the MAC layer.

In an embodiment, the radio units comprise at least one of remote radio units, RRU, and radio base units, RBU.

In an embodiment, the radio units comprise a plurality of beamforming antennas.

In an embodiment, the baseband unit is an evolved NodeB, eNB. The baseband unit comprises a downlink scheduler configured to assign and allocate radio resources.

In an embodiment, adjusting a radio resource allocation one of the plurality of radio units comprises one of: changing a current modulation format used at the radio unit for radio transmission to a different modulation format having a lower spectral-efficiency; and changing a current number of radio beams used at the radio unit for radio transmission to a lower number of radio beams.

The radio spectral efficiency within the radio access network may thereby be improved for a given transport bandwidth and latency, with the radio spectral efficiency being reduced "just enough" to avoid imminent congestion at the remote node within the transport network.

In an embodiment, the plurality of traffic flows comprise one or more of a low-latency packet interface traffic flow, an Ethernet traffic flow, a common public radio interface traffic flow and a wireless fidelity traffic flow. The method may be applied to the case of multiplexing traffic from multiple RBUs, or it may be applied to cases where traffic of different types need to be merged.

In an embodiment, the radio communications network comprises a radio access network comprising a plurality of radio units, RBU, and a transport network comprising a remote node.

In an embodiment, the radio transport network comprises an xHaul network.

In an embodiment, the radio communications network comprises a radio access network, comprising a plurality of radio units, RBU, for communication with user equipment, UE, a transport network comprising a remote node located generally near the radio units, serving as an access point to the transport network, and a hub node serving a plurality of baseband units, located remote from the remote node and the radio units.

In an embodiment, the radio communications network comprises a plurality of baseband units and an orchestrator. The method further comprises causing a further control signal to be sent from the orchestrator to the remote node. The further control signal comprises an indication of to which of the plurality of baseband units the control signal is to be caused to be sent. The method may therefore be applied when there are a plurality of radio units and a plurality of baseband units and the remote node does not have visibility of which baseband unit is responsible for managing the radio resource allocation of the radio unit causing the overflow.

Another aspect of the invention provides a remote node for a radio communications network. The remote node comprises a common buffer and a radio resource allocation element. The common buffer is configured to receive a plurality of traffic flows transmitted from a plurality of radio units of the radio communications network and is configured to buffer the plurality of traffic flows. The radio resource allocation element is configured to cause a control signal to be sent to a baseband unit of the radio communications network when a fill level of the common buffer is predicted to go above a maximum fill level within a pre-set time interval. The control signal is configured to cause an adjustment of a radio resource allocation of one of the plurality of radio units to cause a reduction in a data rate of the traffic flow transmitted from said radio unit.

The remote node forms an access point to a transport network of the radio communications network.

The remote node is configured to interact with a baseband unit by which radio resource allocation within a radio access network of the radio communications network may be adjusted when the transport resources at the remote node are near to an overflow condition. The radio resource allocation element causes the baseband processing within the radio access network of the radio communications network to downscale radio performances "just enough" to come back to an acceptable rate. The radio service availability may therefore be maximized without overprovisioning the transport network of the radio communications network. The radio resource allocation element may thereby dynamically prevent the risk of congestion at the remote node and may avoid packet losses without the need for expensive bandwidth overprovisioning in the transport network infrastructure and without limiting spectrum usage a priori. This may further stretch operation of a radio communications network at the limit of minimal latency, increasing spectrum usage and removing even potentially rare events, with a faster response. The remote node may be deployed without requiring modifications to currently deployed radio units.

The remote node may support resource allocation needs in 5G Xhaul networks. When statistical multiplexing is used in order to meet these needs, the congestion avoidance provided at the remote node may be beneficial to minimize the risk of traffic loss or degradation.

In an embodiment, the radio resource allocation element is configured to monitor a fill level and a fill rate of the common buffer and is configured to predict, based on a current fill level and a current fill rate, whether the fill level will go above the maximum fill level within the pre-set time interval. The radio resource allocation element may thereby control traffic flows at the remote node taking into account the data rates of the traffic flows and the delay introduced by the common buffer.

In an embodiment, the control signal comprises a reallocation request and the radio resource allocation element is configured to transmit the reallocation request to the baseband unit. The reallocation request is configured to cause the adjustment of the radio resource allocation of one of the plurality of radio units. The remote node may therefore interact directly with the baseband unit.

In an embodiment, the remote node further comprises a plurality of input buffers configured to receive respective ones of the plurality of traffic flows. The input buffers are configured to buffer the plurality of traffic flows and are configured to output the plurality of traffic flows to the common buffer. The radio resource allocation element is configured to monitor a respective fill level of each input buffer. The radio resource allocation element is additionally configured to predict, based on a current fill level of each input buffer, whether the fill level of the common buffer will go above the maximum fill level within the pre-set time interval. This is useful, in particular, to determine which of the input traffic flows is causing the potential overflow condition at the common buffer.

In an embodiment, the radio resource allocation element is configured to identify which of the traffic flows has caused the fill level of the respective input buffer to go above a preselected threshold fill level when it has predicted that the fill level of the common buffer will go above the maximum fill level within the pre-set time interval. The radio resource allocation element is configured to transmit the control signal to the baseband unit. The control signal comprises a reallocation request configured to cause an adjustment of the radio resource allocation of the radio unit from which the said traffic flow is transmitted.

In an embodiment, the radio resource allocation element is configured to identify which of the traffic flows has caused the fill level of the respective input buffer to go above a preselected threshold fill level when it has predicted that the fill level of the common buffer will go above the maximum fill level within the pre-set time interval. The radio resource allocation element is configured to transmit the control signal to the radio unit from which the said traffic flow is transmitted. The control signal comprises a resource allocation feedback signal configured to cause the radio unit to adjust a user equipment parameter for negotiating the radio resource allocation of the radio unit at the baseband unit. The resource allocation feedback signal is additionally configured to cause the radio unit to send a control plane signal comprising an indication of the user equipment parameter to the baseband unit.

By identifying which of the traffic flows is expected to cause the potential overflow condition at the common buffer, only the radio performance of that radio unit needs to be degraded and the radio performance of the other radio units will not be affected.

The radio resource allocation element could be implemented as one or more processors, hardware, processing hardware or circuitry.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

In an embodiment, the control plane signal is carried in a medium access control, MAC, layer of the radio communications network. In an embodiment, the control plane signal comprises one of channel quality information, CQI, and a buffer status report, BSR, carried in the MAC layer.

In an embodiment, the radio units comprise at least one of remote radio units, RRU, and radio base units, RBU.

In an embodiment, the radio units comprise a plurality of beamforming antennas.

In an embodiment, the baseband unit is an evolved NodeB, eNB. The baseband unit comprises a downlink scheduler configured to assign and allocate radio resources.

In an embodiment, an adjustment of a radio resource allocation one of the plurality of radio units comprises one of: a change from a current modulation format used at the radio unit for radio transmission to a different modulation format having a lower spectral-efficiency; and a change from a current number of radio beams used at the radio unit to transmit the traffic flow to a lower number of radio beams. The radio spectral efficiency within the radio access network may thereby be improved for a given transport bandwidth and latency, with the radio spectral efficiency being reduced "just enough" to avoid imminent congestion at the remote node.

In an embodiment, the plurality of traffic flows comprise one or more of a low-latency packet interface traffic flow, an Ethernet traffic flow, a common public radio interface traffic flow and a wireless fidelity traffic flow. The remote node may be used for multiplexing traffic from multiple RBUs, or it may be used where traffic of different types need to be merged.

In an embodiment, the radio communications network comprises a radio access network comprising a plurality of radio units, RBU, and a transport network comprising the remote node.

In an embodiment, the radio transport network comprises an xHaul network.

It is noted that the term xHaul is also intended to embrace other terms used to represent such a network, for example "anyhaul", "newhaul" or "omnihaul". Networks such as xHaul are evolving to include wireline traffic, and they are expected to support whatever will be required to be transported between radio units and baseband units. In such xHaul networks, where all the traffic shares the same transport infrastructure, bounding the distance between nodes to the most stringent one in terms of the latency requirements mentioned earlier would be extremely penalizing for the non-latency critical traffic, i.e. traffic flows that do not have responsiveness requirements, for example the Ethernet traffic. The xHaul network may use wired and/or wireless technologies.

In an embodiment, the radio communications network comprises a radio access network, comprising a plurality of radio units, RBU, for communication with user equipment, UE, a transport network comprising a remote node located generally near the radio units, serving as an access point to the transport network, a hub node serving a plurality of baseband units, located remote from the remote node and the radio units, and an orchestrator. The remote node is configured to receive a further control signal from the orchestrator. The further control signal comprises an indication of which of the plurality of baseband units the radio resource allocation element is to cause the control signal to be sent to. This may enable the remote node to be used when there are a plurality of radio units and a plurality of baseband units in the radio communications network, and the remote node does not have visibility of which baseband unit is responsible for managing the radio resource allocation of the radio unit causing the overflow.

Corresponding embodiments are also applicable to the aspects of the invention described below.

Another aspect of the invention provides radio resource allocation element for controlling traffic flows in a radio communications network comprising a plurality of radio units, a remote node and a baseband unit. The radio resource allocation element comprises processing circuitry. The processing circuitry is configured to cause a control signal to be sent to the baseband unit when a fill level of a common buffer of the remote node is predicted to go above a maximum fill level within a pre-set time interval. The common buffer is configured to buffer a plurality of traffic flows received from the plurality of radio units. The control signal is configured to cause an adjustment of a radio resource allocation of one of the plurality of radio units to cause a reduction in a data rate of the traffic flow transmitted from said radio unit.

Another aspect of the invention provides a radio communications network comprising a plurality of radio units configured to transmit a plurality of traffic flows, a remote node and a baseband unit. The remote node comprises a common buffer and a radio resource allocation element. The common buffer is configured to receive a plurality of traffic flows transmitted from a plurality of radio units of the radio communications network and is configured to buffer the plurality of traffic flows. The radio resource allocation element is configured to cause a control signal to be sent to a baseband unit of the radio communications network when a fill level of the common buffer is predicted to go above a maximum fill level within a pre-set time interval. The control signal is configured to cause an adjustment of a radio resource allocation of one of the plurality of radio units to cause a reduction in a data rate of the traffic flow transmitted from said radio unit.

In an embodiment, the radio communications network comprises a radio access network, comprising the plurality of radio units, RBU, for communication with user equipment, UE, a transport network comprising the remote node located generally near the radio units, serving as an access point to the transport network, and a hub node serving a plurality of baseband units, located remote from the remote node and the radio units.

Another aspect of the invention provides a computer program comprising instructions which, when executed on at least one processor, cause the at least one processor to carry out any of the steps of the above described method of controlling traffic flows in a radio communications network.

Another aspect of the invention provides a carrier containing a computer program comprising instructions which, when executed on at least one processor, cause the at least one processor to carry out any of the steps of the above described method of controlling traffic flows in a radio communications network. The carrier is one of an electronic signal, optical signal, radio signal, or computer readable storage medium.

Embodiments of the invention will now be described, by way of example only, with reference to the accompanying drawings.

BRIEF DESCRIPTION OF THE DRAWINGS

FIG. 1 illustrates a prior art radio access network architecture, including an xHaul network;

FIGS. 2 to 9 illustrate the steps of methods according to embodiments of the invention of controlling traffic flows in a radio communications network;

DETAILED DESCRIPTION

The same reference numbers will used for corresponding features in different embodiments.

Referring to FIG. 2, an embodiment of the invention provides a method 100 of controlling traffic flows in a radio communications network. The method comprises steps of receiving 102 at a remote node a plurality of traffic flows transmitted from a plurality of radio units and buffering 104 the traffic flows in a common buffer of the remote node. The method further comprises causing 106 a control signal to be sent to a baseband unit when a fill level of the common buffer is predicted to go above a maximum fill level within a pre-set time interval. The control signal is configured to cause an adjustment of a radio resource allocation of one of the plurality of radio units to cause a reduction in a data rate of the traffic flow transmitted from that radio unit.

One of the key Radio Resource Management, RRM, functions in Long Term Evolution, LTE, networks is Medium Access Control, MAC, scheduling, which coordinates access to shared radio resources. In LTE networks, each user is allocated a number of "resource blocks" in a time-frequency grid. The more resource blocks a user is allocated, and the higher the modulation format used at the radio units for radio transmission, the higher the transmission bit rate. Which resource blocks and how many a user is allocated at a given point in time depend on advanced scheduling mechanisms in the frequency and time dimensions.

The radio units form part of a radio access network of the radio communications network and remote node forms an access point to a transport network of the radio communications network. The remote node may be considered as aggregating data from a plurality of radio units, and so may alternatively be termed an aggregation node. The adjustment of a radio resource allocation may refer to adjustment of any aspect of radio resource used by a radio unit for communication with one or more wireless device (UE).

Figure 3:
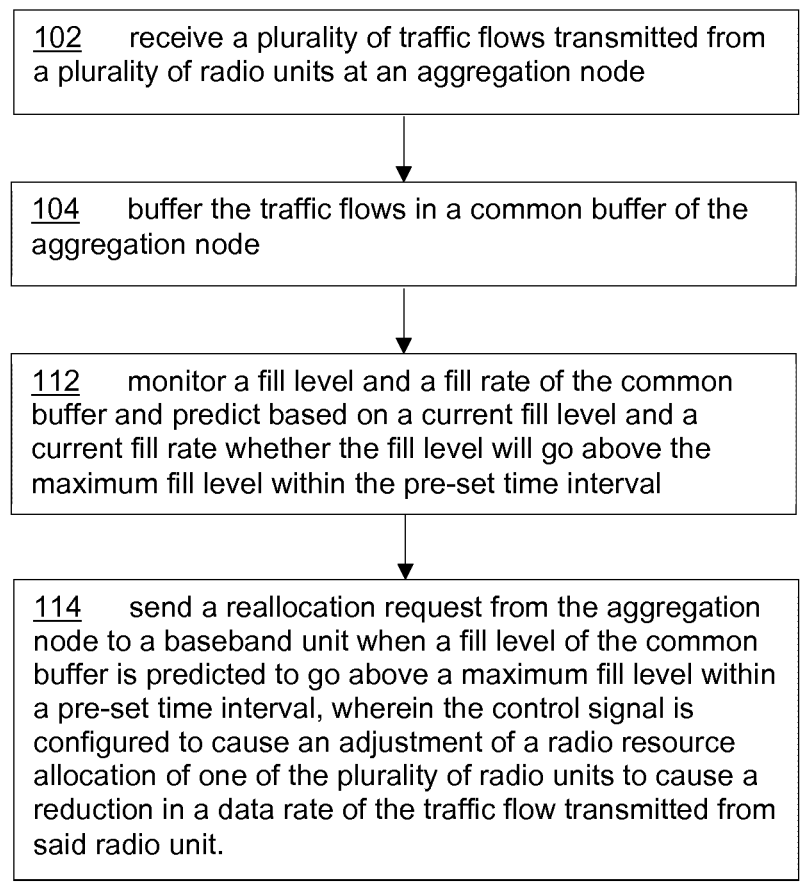

An embodiment of the invention provides a method 110 of controlling traffic flows in a radio communications network, as illustrated in FIG. 3.

The method 110 additionally comprises monitoring 112 a fill level and a fill rate of the common buffer. Based on a current fill level and a current fill rate, it is then predicted whether the fill level will go above the maximum fill level within the pre-set time interval.

In this embodiment, the step of causing a control signal to be sent to a baseband unit comprises sending 114 a reallocation request from the remote node to the baseband unit. The reallocation request is configured to cause an adjustment of the radio resource allocation of one of the radio units, to cause a reduction in the data rate of the traffic flow transmitted from that radio unit.

Figure 4:
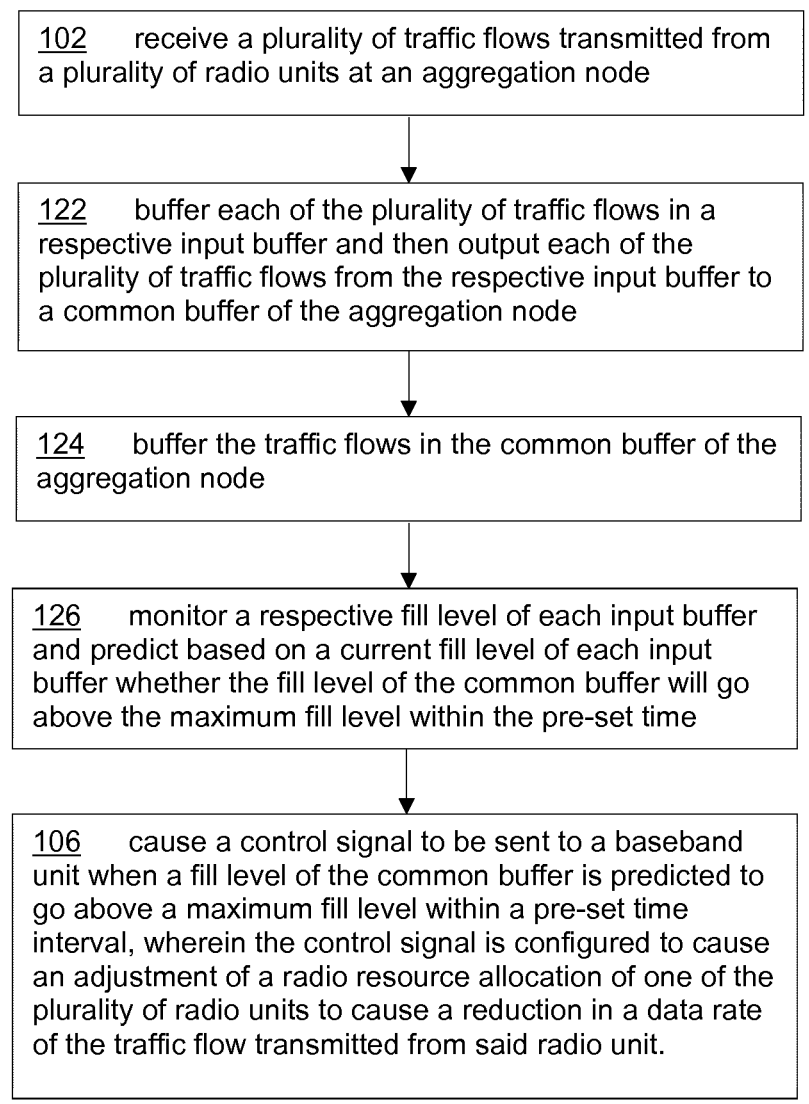

As illustrated in FIG. 4, an embodiment of the invention provides a method 120 of controlling traffic flows in a radio communications network, comprising the following additional steps.

In this embodiment, each of the traffic flows received from the radio units is buffered 122 in a respective input buffer of the remote node. Each of the traffic flows is then output 122 from the respective input buffer to the common buffer and is buffered 124 in the common buffer.

The method 120 comprises monitoring 126 a respective fill level of each input buffer. Then, based on a current fill level of each input buffer, predicting 126 whether the fill level of the common buffer will go above the maximum fill level within the pre-set time interval.

As described above, a control signal is caused to be sent 106 to a baseband unit when the fill level of the common buffer is predicted to go above the maximum fill level within the pre-set time interval.

Figure 5:
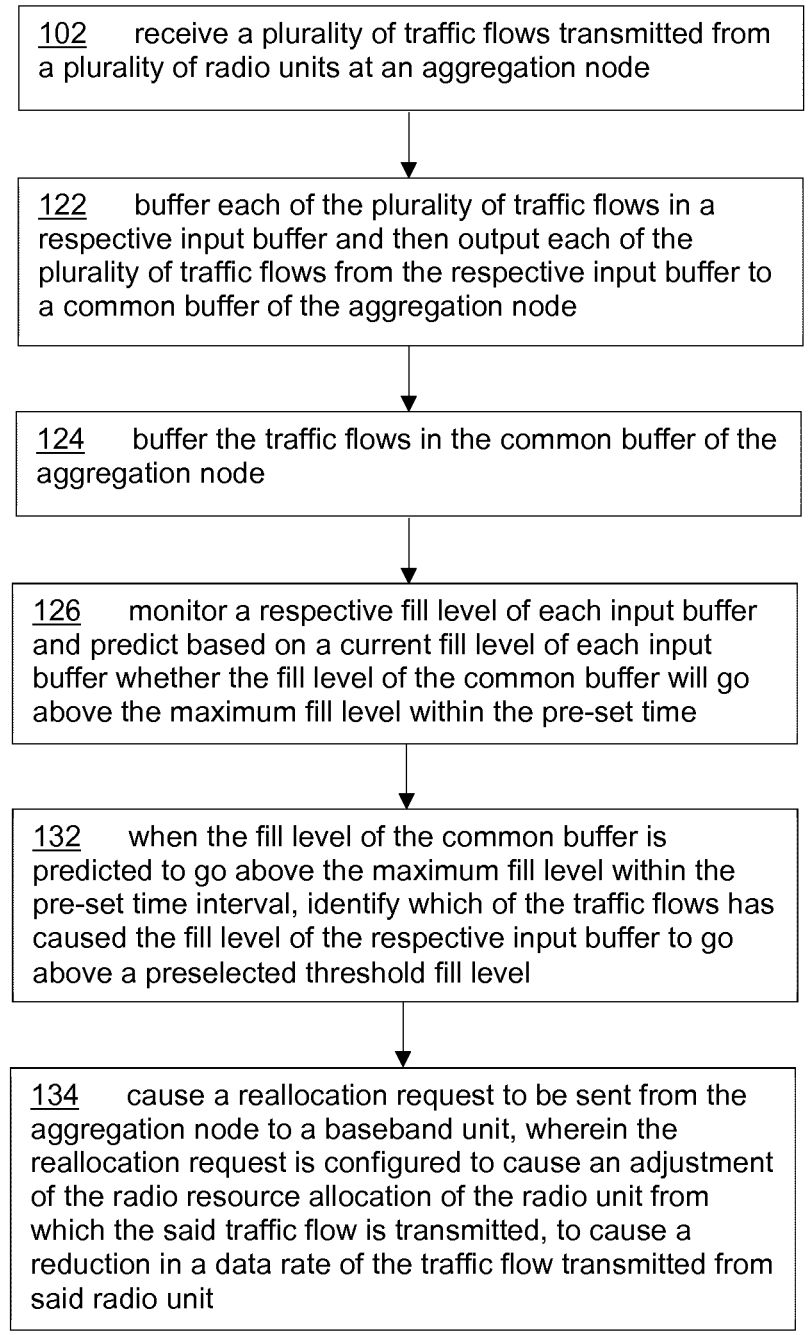

An embodiment of the invention, illustrated in FIG. 5, provides a method 130 of controlling traffic flows in a radio communications network, which is similar to the method 120 of the previous embodiment.

The method 130 of this embodiment additionally comprises identifying 132 which of the traffic flows has caused the fill level of the respective input buffer to go above a preselected threshold fill level, when the fill level of the common buffer is predicted to go above the maximum fill level within the pre-set time interval. In other words, the method of this embodiment additionally identifies which traffic flow is the one that is going to cause the predicted overflow of the common buffer.

Causing a control signal to be sent to the baseband unit here comprises causing 134 a reallocation request to be sent from the remote node to the baseband unit. The reallocation request is configured to cause an adjustment of the radio resource allocation of the radio unit from which the traffic flow that is going to cause the predicted overflow of the common buffer is transmitted.

Figure 6:
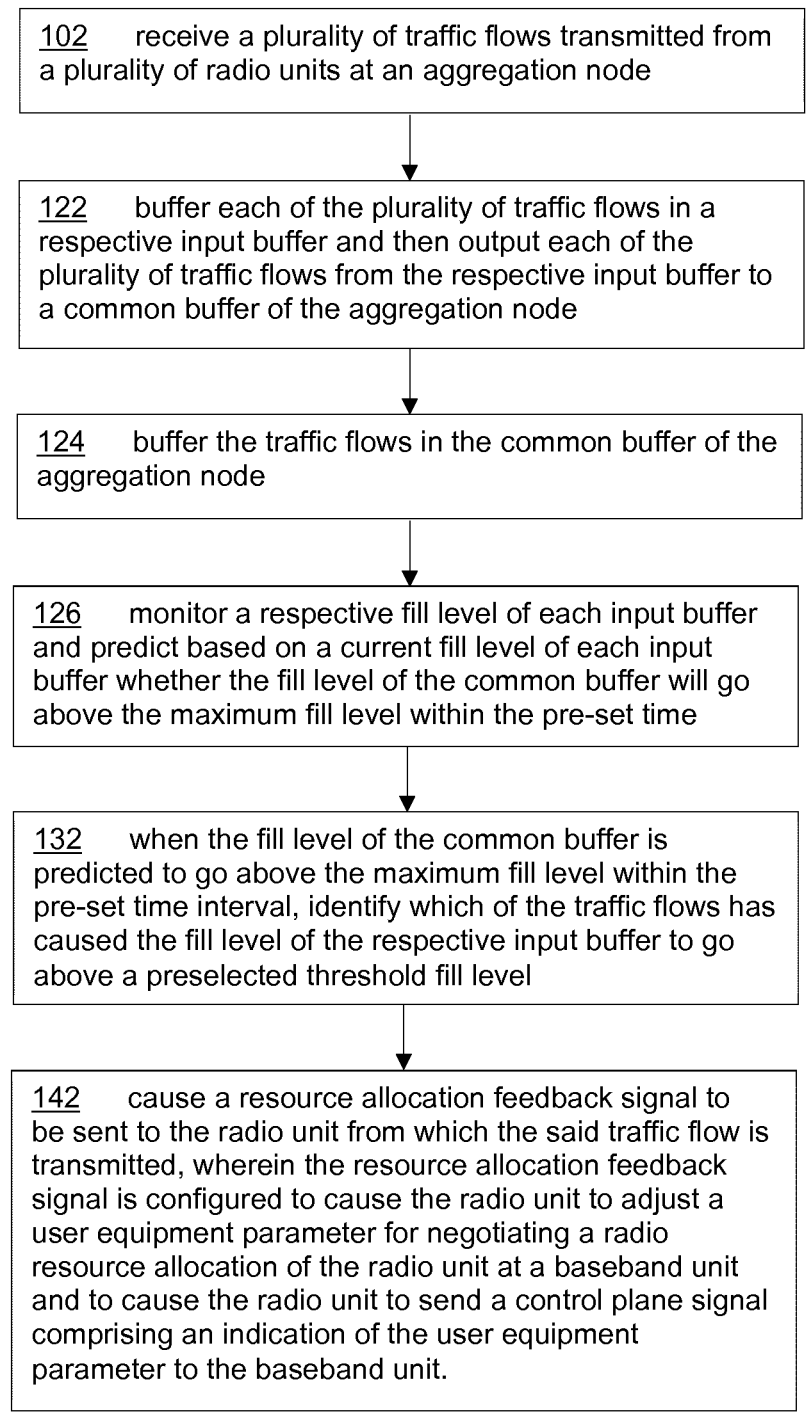

An embodiment of the invention, illustrated in FIG. 6, provides a method 140 of controlling traffic flows in a radio communications network, which is similar to the method 130 of the previous embodiment.

In this embodiment, causing a control signal to be sent to the baseband unit comprises causing 142 a resource allocation feedback signal to be sent to the radio unit from which the traffic flow that is going to cause the predicted overflow of the common buffer is transmitted. The resource allocation feedback signal is configured to cause that radio unit to adjust a user equipment parameter for negotiating its radio resource allocation at the baseband unit. The resource allocation feedback signal is additionally configured to cause the radio unit to send a control plane signal comprising an indication of the adjusted user equipment parameter to the baseband unit.

In an embodiment, the control plane signal is carried in a medium access control, MAC, layer of the radio communications network. In an embodiment, the control plane signal comprises one of channel quality information, CQI, and a buffer status report, BSR, carried in the MAC layer.

An embodiment of the invention, illustrated in FIG. 7, provides a method 150 of controlling traffic flows in a radio communications network, which is similar to the method 100 illustrated in FIG. 2.

In this embodiment, the adjustment of the radio resource allocation of a radio unit comprises changing 152 the modulation format used at the radio unit for radio transmission from a current modulation format to a different modulation format, having a lower spectral-efficiency than the current modulation format. The modulation format is changed so that the spectral-efficiency is reduced just enough to avoid imminent overflow of the common buffer, e.g. for a given transport bandwidth and latency. The resource allocation feedback signal is therefore configured to cause baseband processing of the radio network to downscale radio performances just enough to come back to an acceptable rate. Radio service availability may thus be maximized without overprovisioning the transport network.

An embodiment of the invention, illustrated in FIG. 8, provides a method 160 of controlling traffic flows in a radio communications network, which is similar to the method 100 illustrated in FIG. 2.

In this embodiment, the radio units comprise a plurality of beamforming antennas. The adjustment of the radio resource allocation the of a radio unit comprises changing 162 the number of radio beams used at the radio unit for radio transmission from a current number to a lower number of radio beams.

In an embodiment, the baseband unit is an eNodeB comprising a downlink scheduler. The downlink scheduler assigns and allocates radio resources to all users in a radio cell in each Transmission Time Interval, TTI; the TTI is 1 ms for LTE. The downlink scheduler uses information on available eNodeB resources, Channel Quality Indicator, CQI, reports data from the user equipments, UEs, within the radio cell and Quality of Service, QoS, priorities in order to make scheduling decisions.

The eNodeB also performs measurements in Uplink to support the uplink scheduler to make scheduling decisions and send scheduling grants to the UE over PDCCH.

The UE may send a scheduling request when it has no scheduled resources and has data in its Uplink buffer, for example via BSR signalling, which carries the information on how much data is in the UE buffer to be sent out.

In an embodiment, the radio communications network comprises a radio access network, comprising a plurality of radio units, RBU, for communication with user equipment, UE, a transport network comprising a remote node located generally near the radio units, serving as the access point to the transport network, a hub node serving a plurality of baseband units, located remote from the remote node and the radio units, and an orchestrator. In this embodiment, the method further comprises causing a further control signal to be sent from the orchestrator to the remote node. The further control signal comprises an indication of to which of the plurality of baseband units the control signal is to be caused to be sent. The method may therefore be applied when there are a plurality of radio units and a plurality of baseband units and the remote node does not have visibility of which baseband unit is responsible for managing the radio resource allocation of the radio unit causing the overflow.

In an embodiment, the plurality of traffic flows comprise a plurality of low-latency packet interface traffic flows. In another embodiment, low-latency packet interface traffic flows may be mixed with one or more Ethernet traffic flows, originating for example from a RBS or wireline sources, CPRI traffic flows and wireless fidelity, Wi-Fi, traffic flows.

The low-latency packet interface traffic flows follow the trend of radio traffic and have a bursty behavior. In particular, the combined bit rate distribution of traffic flows from three sectors (where each RBU is mapped to one sector) is sufficiently close to a Gaussian distribution. This has been verified with real measured distributions. The more of these distributions, i.e. more than 3, that are observed at the same time, the more the combined distribution approaches a Gaussian normal distribution. As a consequence, more low-latency packet interface traffic flows, transmitted to the same remote node, could benefit from statistical multiplexing thus demanding a reduced transport bandwidth with respect to a transport bandwidth dimensioned for the sum of traffic flow peaks.

Figure 9:
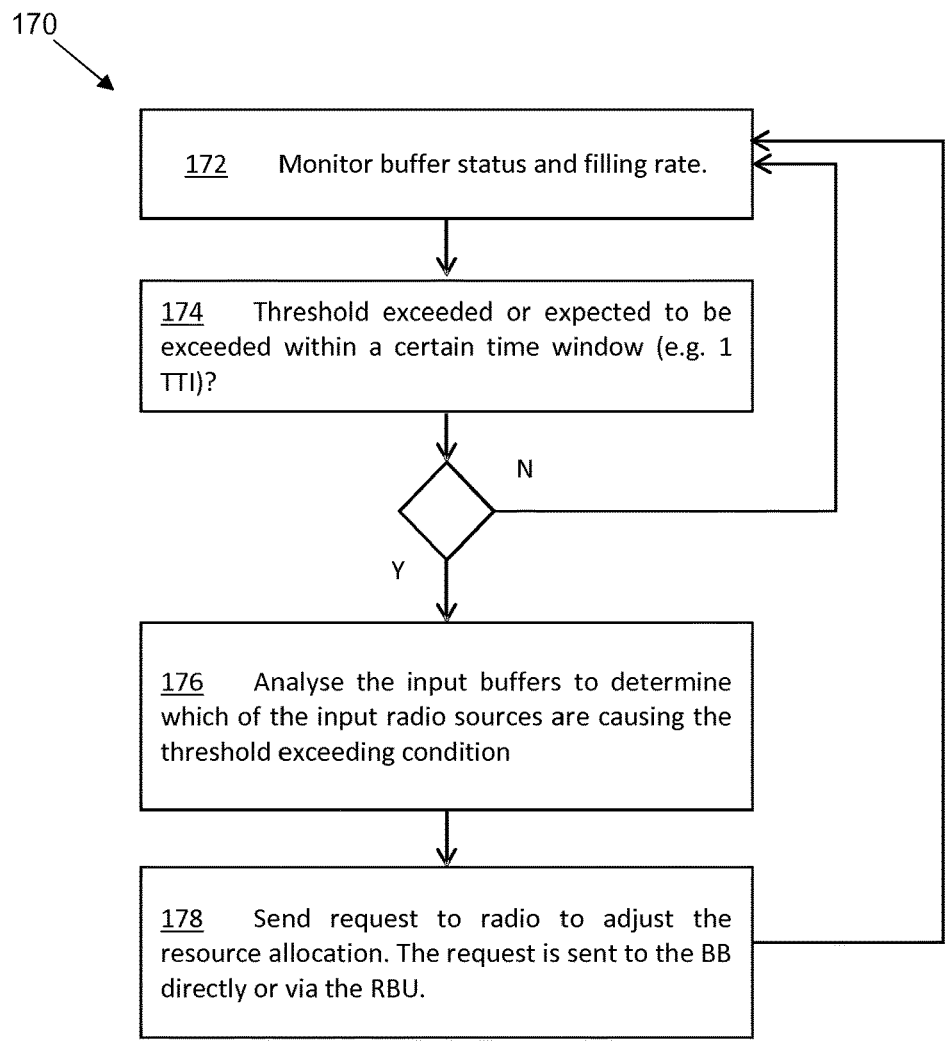

An embodiment of the invention provides a method of controlling traffic flows in a radio communications network. Some of the steps 170 of this embodiment are illustrated in FIG. 9.

As in the method of FIG. 4, the method of this embodiment comprises receiving 102 a plurality of traffic flows, transmitted from a plurality of radio units, at a remote node. Each of the traffic flows received from the radio units is buffered 122 in a respective input buffer of the remote node.

Each of the traffic flows is then output 122 from the respective input buffer to the common buffer of the remote node.

In this embodiment, the method 170 comprises monitoring 172 the status and filling rate of the common buffer. The method 170 additionally comprises determining 174 if the fill level of the common buffer exceeds a threshold, maximum fill level or if the threshold is expected to be exceeded within a certain time window, for example 1 TTI. If not, the method continues monitoring the status and filling rate of the common buffer. If the common buffer fill level threshold is exceeded, or expected to be exceeded, the method comprises analysing 176 the input buffers to identify which of the input radio units are causing the threshold exceeding condition. A request is then sent 178 to the identified radio unit to adjust its resource allocation. The request may be sent to the baseband unit, BB, directly or via the radio unit, RBU, as described above.

Figure 10:
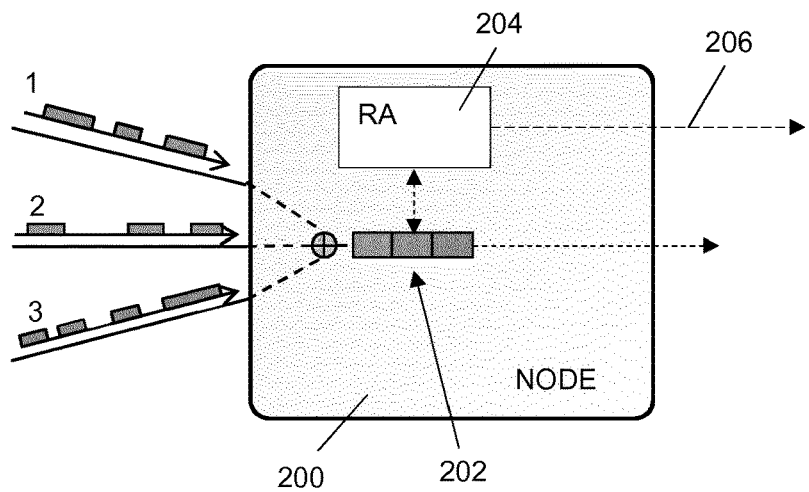
FIGS. 10 and 11 illustrate remote nodes according to embodiments of the invention.

Referring to FIG. 10, an embodiment of the invention provides a remote node 200 for a radio communications network. The remote node comprises a common buffer 202 and a radio resource allocation element 204.

The remote node 200 is configured to form an access point to a transport network of a radio communications network.

The common buffer 202 is configured to receive a plurality of traffic flows 1, 2, 3 transmitted from a plurality of radio units within a radio access network of the radio communications network and is configured to buffer each of the traffic flows. The radio resource allocation element 204 is configured to cause a control signal 206 to be sent to a baseband unit of the radio communications network when a fill level of the common buffer is predicted to go above a maximum fill level within a pre-set time interval. The control signal is configured to cause an adjustment of a radio resource allocation of one of the radio units to cause a reduction in a data rate of the traffic flow transmitted from that radio unit.

In an embodiment, the radio resource allocation element 204 is configured to monitor a fill level and a fill rate of the common buffer and is configured to predict based on a current fill level and a current fill rate whether the fill level will go above the maximum fill level within the pre-set time interval.

In an embodiment, the control signal 206 comprises a reallocation request and the radio resource allocation element is configured to transmit the reallocation request to the baseband unit. The reallocation request is configured to cause the adjustment of the radio resource allocation of one of the radio units.

In an embodiment, the common buffer 202 is included in the remote node to manage traffic peaks from a number of radio traffic flows. The longer the buffer, the more robust the system is against traffic loss, but higher is the latency acquired at the remote node.

FIGS. 1 and 10, illustrate the case in which three low latency packet interface traffic flows are wrapped together and transmitted on a shared optical channel in the transport network. The common buffer is able to manage one traffic peak per TTI, which ensures minimal impact on the edge-to-edge latency at to the remote node. If the traffic condition overcomes the capacity of the common buffer, a radio resource allocation element 204 establishes a "cooperation" with radio, by causing a control signal 206 to be sent to the baseband unit, asking for a reduction of traffic throughput by a controlled degradation of radio performance, by causing an adjustment of a radio resource allocation of one of the radio units to cause a reduction in the data rate of the traffic flow transmitted from that radio unit. This prevents uncontrolled packet loss due to common buffer overflow.

The radio resource allocation element 204 is a Real-Time Radio Resource Allocation, RT RA, functional block within the remote node. The RT RA monitors the status of the common buffer by means of a pre-defined threshold. The threshold may be based on the time needed to react to a potential overflow situation. For example, in LTE, 2 ms are needed to take into account the TTI, plus some margin and the fill rate of the common buffer. Alternatively, the radio resource allocation element 204 is located separately to the remote node 204, and is in communication with at least one of the remote node 204, radio units and/or baseband units.

The RT RA may be implemented as one or more processors, hardware, processing hardware or circuitry. References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Figure 11:
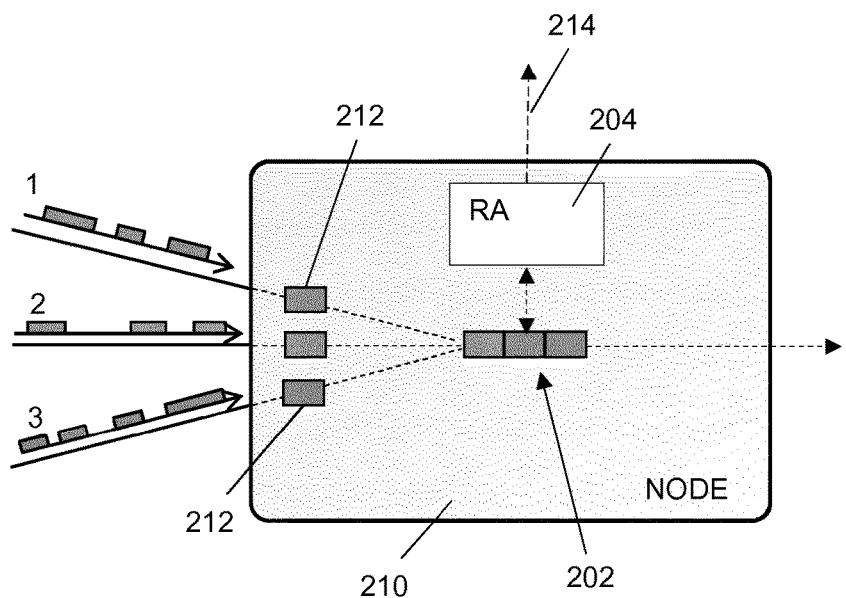

Referring to FIGS. 1 and 11, an embodiment of the invention provides a remote node 210 for a radio communications network. In this embodiment, the remote node additionally comprises a plurality of input buffers 212; three input buffers are illustrated, one for each of the RBUs, but it will be appreciated that a greater number of input buffers may be provided, to handle a greater number of traffic flows.

The input buffers 212 are configured to receive respective ones of the plurality of traffic flows and to buffer the plurality of traffic flows. The input buffers are also configured to output the plurality of traffic flows to the common buffer 202. The radio resource allocation element 204 is configured to monitor a respective fill level of each input buffer and is configured to predict based on a current fill level of each input buffer whether the fill level of the common buffer will go above the maximum fill level within the pre-set time interval.

In an embodiment, the radio resource allocation element 204 is additionally configured to, having predicted that the fill level of the common buffer will go above the maximum fill level within the pre-set time interval, identify which of the traffic flows has caused the fill level of the respective input buffer to go above a preselected threshold fill level. The radio resource allocation element 204 is configured to transmit the control signal from the remote node to the radio unit from which the overflow causing traffic flow is transmitted. In this embodiment, the control signal comprises a resource allocation feedback signal 214 configured to cause the radio unit to adjust a user equipment parameter for negotiating the radio resource allocation of the radio unit at the baseband unit. The resource allocation feedback signal 214 is also configured to cause the radio unit to then send a control plane signal comprising an indication of the user equipment parameter to the baseband unit.

In a further embodiment, the radio resource allocation element 204 is additionally configured to transmit a control signal 206 from the remote node directly to the baseband unit. The control signal comprises a reallocation request configured to cause the baseband unit to adjust the radio resource allocation of the radio unit from which the overflow causing traffic flow is transmitted.

Figure 12:
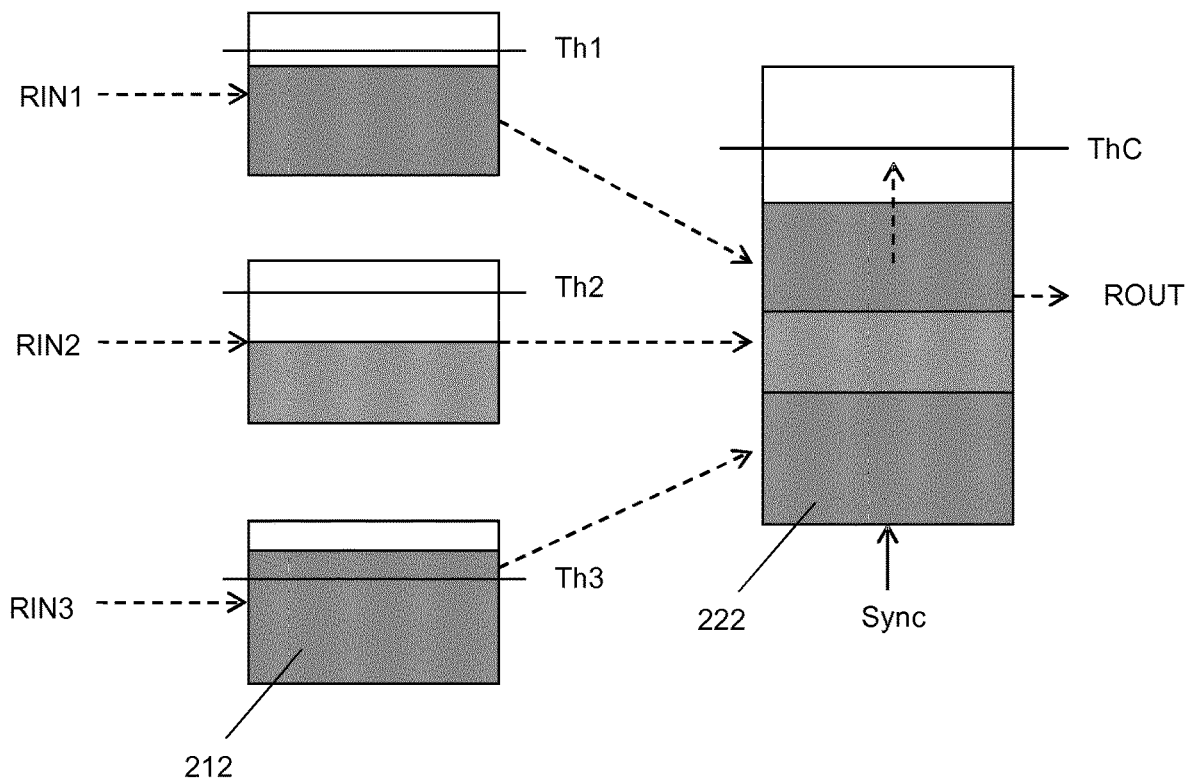
FIG. 12 illustrates operation of the input buffers and common buffer of the remote node of FIG. 11.

Referring to FIGS. 11 and 12, in an embodiment where input buffers are provided at the input ports of the remote node, thresholds, Th1, Th2, Th3, can be used to determine whether each of the input buffers are approximating to a specific fill level. The remote node is configured to communicate this information to the common buffer, which in this embodiment forms a common output buffer. This is useful, in particular, to determine which of the input traffic flows, 1, 2, 3, is causing the overflow condition at the common buffer. In the example illustrated in FIG. 12, the third traffic flow, RIN3, is exceeding its input threshold Th3 and will, sooner or later, cause an overflow of the common buffer threshold, ThC, thus impacting all the input flows, not only the third one.

In this embodiment, the RT RA causes a resource allocation feedback signal to be sent to the RBU transmitting RIN3, asking for a degradation of radio performance of the third RBU, while the other two RBUs are not affected. The RBU that receives the resource allocation feedback signal can modify "on-the-fly" the existing UEs parameters used to re-negotiate resource allocation at the BB. For example, by modifying the CQI or BSR exchanged over a MAC layer of the radio communications network.

Referring to FIGS. 10 and 11, communication from the RT RA to the BB or RBU can be done over existing control or operations, administration and management, OAM, protocols. This could be also done via a centralized controller, such as a software defined networking, SDN, controller, or a management element, within the radio communications network.

Figure 13:
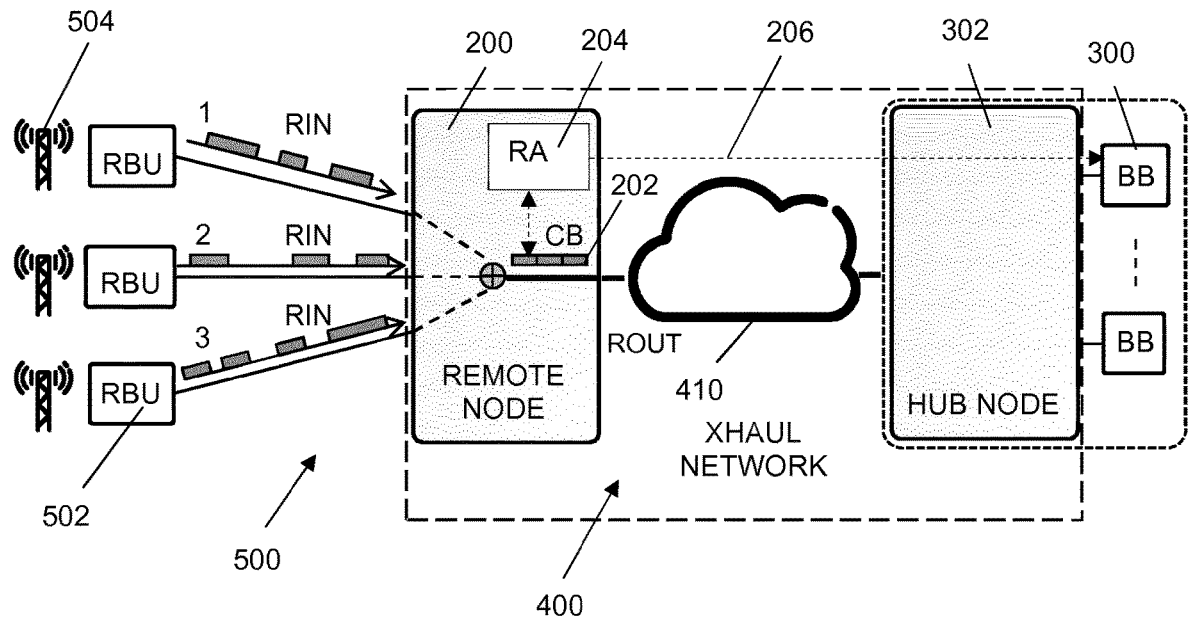
FIG. 13 illustrates a radio communications network according to an embodiment of the invention, comprising a radio communications network according to another embodiment of the invention and a baseband unit according to a further embodiment of the invention.

Referring to FIG. 13, an embodiment of the invention provides a radio communications network 500 comprising a plurality of radio units 502 configured to transmit a plurality of traffic flows 1, 2, 3, a remote node 200 as described above with reference to FIG. 10, and a plurality of baseband units 300.

The baseband units 300 are connected to a hub node 302, and through the hub node and optical fibre link 410 to the remote node 210. The remote node, optical fibre link and hub node together form a transport network, which in this example is an xHaul network 400.

In this embodiment, the radio resource allocation element, RA, 204 communicates directly with the respective BB 300, which causes a reallocation of radio resources as described above.

Figure 15:
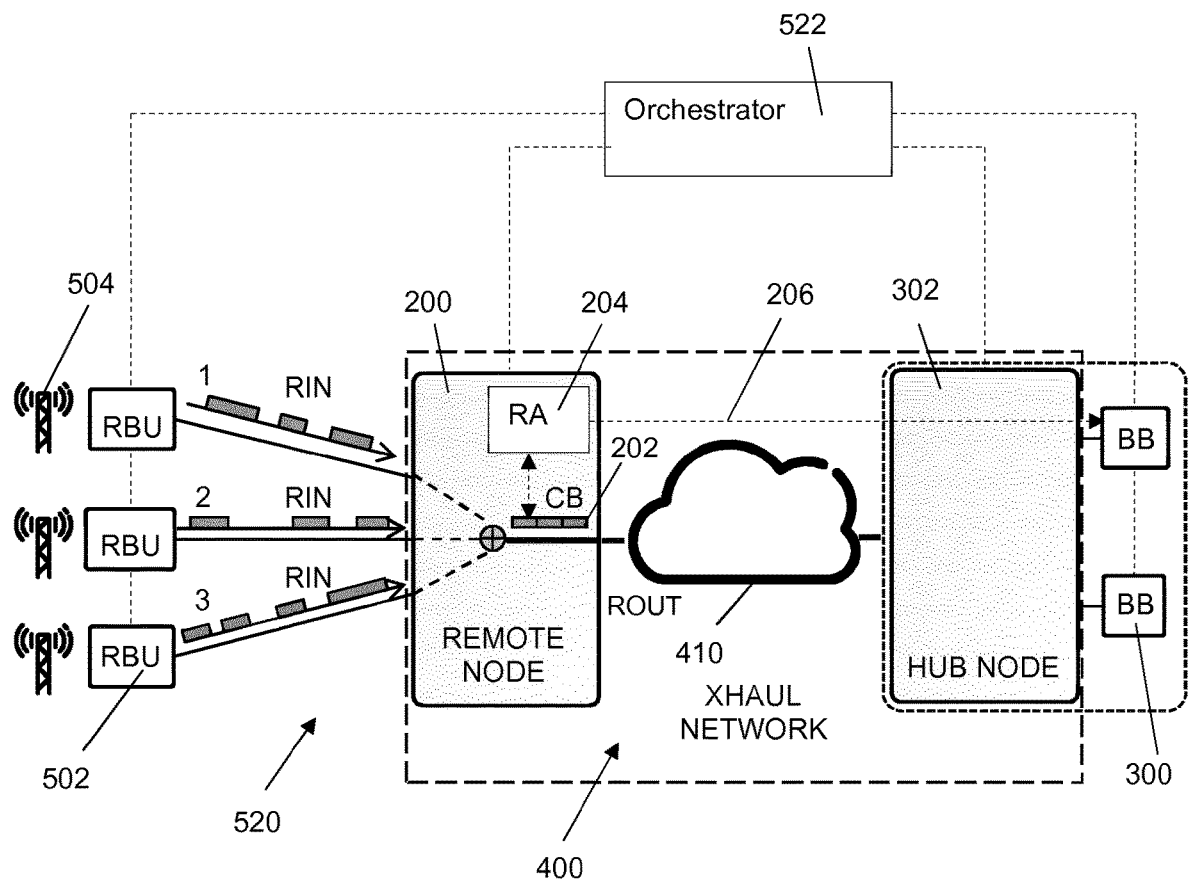
FIG. 15 illustrates a radio communications network according to an embodiment of the invention, comprising a radio communications network according to another embodiment of the invention and a baseband unit according to a further embodiment of the invention.

In an embodiment, illustrated in FIG. 15, where different BBs 300 using the same RBU 502, if the remote node 200 does not have visibility of which BB is responsible for the RBU generating the traffic flow causing the predicted overflow of the common buffer, CB, 202, the network 520 additionally comprises an orchestrator 522. The remote node 200 is configured to receive a further control signal from the orchestrator. The further control signal comprises an indication of which BB the radio resource allocation element is to cause the control signal 206 to be sent to. In this scenario, it is then possible to make a judgement based on additional information, if available, at the orchestrator level as to which RBU to perform radio resource allocation on, or to equally impact all the traffic flows.

Figure 14:
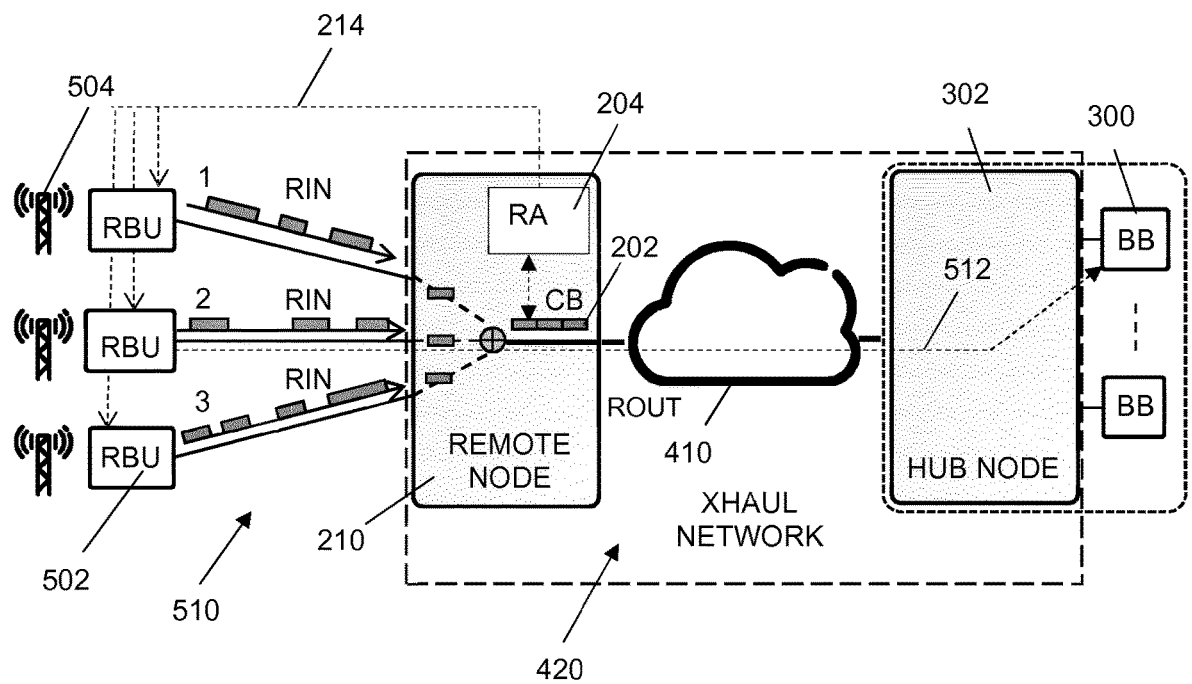
FIG. 14 illustrates a radio communications network according to an embodiment of the invention, comprising a radio communications network according to another embodiment of the invention and a baseband unit according to a further embodiment of the invention.

Referring to FIG. 14, an embodiment of the invention provides a radio communications network 510 comprising a plurality of radio units 502 configured to transmit a plurality of traffic flows 1, 2, 3, a remote node 210 as described above with reference to FIG. 11, and a plurality of baseband units 300.

As described above, the radio resource allocation element 204 is configured to transmit a resource allocation feedback signal 214 from the remote node 210 to the RBU 502 from which the overflow causing traffic flow is transmitted. The resource allocation feedback signal is configured to cause the radio unit to adjust a user equipment parameter for negotiating the radio resource allocation of the RBU at the respective BB 300. The resource allocation feedback signal 214 is also configured to cause the RBU to then send a control plane signal 512 comprising an indication of the user equipment parameter to the BB. In some aspects, the RBU (s) 502 that receives the signal 512 is configured to modify "on-the-fly", i.e. dynamically, the existing UEs parameters used to re-negotiate the resource allocation at the baseband units. For example, the RBU may be configured to modify a parameter used for negotiating the radio resource allocation, e.g. a parameter indicating signal quality and/or strength, e.g. CQI or BSR.

In this embodiment, the BBs 300 are eNodeBs, comprising downlink schedulers configured to assign and allocate radio resources. The control plane signal is carried in a medium access control, MAC, layer of the radio communications network 510. The control plane signal may comprise one of channel quality information, CQI, and a buffer status report, BSR. As such, the modified parameter used for negotiating the radio resource allocation is in some examples exchanged over the MAC control plane signalling.

In an embodiment, where different BBs 300 using the same RBU 502, if the remote node 210 does not have visibility of which BB is responsible for the RBU generating the traffic flow causing the predicted overflow of the common buffer, CB, 202, the RBU itself is able make the correct decision. In fact, when the RBUs belong to different BB, the signalling arrangement used in this embodiment is transparent to the RBU/BB relationship. The correct BB will be addressed by the RBU sending the control plane signal 512.

An embodiment of the invention provides a computer program comprising instructions which, when executed on at least one processor, cause the at least one processor to carry out any of the steps of the above described method 100, 110, 120, 130, 140, 150, 160 of controlling traffic flows in a radio communications network.

An embodiment of the invention provides a carrier containing the computer program of the previous embodiment. The carrier is one of an electronic signal, optical signal, radio signal, or computer readable storage medium.

Figure 16:
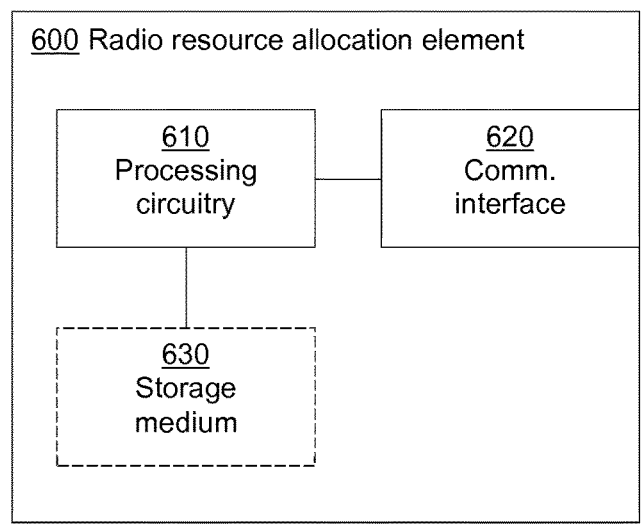
FIG. 16 illustrates a radio resource allocation element according to an embodiment of the invention.

FIG. 16 schematically illustrates, in terms of a number of functional units, the components of a radio resource allocation element 600 according to an embodiment for controlling traffic flows in a radio communications network comprising a plurality of radio units, a remote node and a baseband unit. Processing circuitry 610 is provided using any combination of one or more of a suitable central processing unit (CPU), multiprocessor, microcontroller, digital signal processor (DSP), etc., capable of executing software instructions stored in a computer program product, e.g. in the form of a storage medium 630. The processing circuitry 610 may further be provided as at least one application specific integrated circuit (ASIC), or field programmable gate array (FPGA).

Particularly, the processing circuitry 610 is configured to cause the radio resource allocation element 600 to perform a set of operations, or steps, 106, 112, 114, 126, 132, 134, 142, 152, 162 as disclosed above. For example, the storage medium 630 may store the set of operations, and the processing circuitry 610 may be configured to retrieve the set of operations from the storage medium 630 to cause the radio resource allocation element 600 to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The radio resource allocation element 600 may further comprise a communications interface 620 for communications at least with one of a baseband unit, BB, 300, a radio unit, RBU, 502, and an orchestrator 522. As such the communications interface 620 may comprise one or more transmitters and receivers, comprising analogue and digital components and a suitable number of antennas for wireless communications and ports for wireline communications.

The processing circuitry 610 controls the general operation of the radio resource allocation element 600 e.g. by sending data and control signals to the communications interface 620 and the storage medium 630, by receiving data and reports from the communications interface 620, and by retrieving data and instructions from the storage medium 630. Other components, as well as the related functionality, of the radio resource allocation element 600 are omitted in order not to obscure the concepts presented herein.

The invention claimed is:

1. A method of controlling traffic flows in a radio communications network, the method comprising:
   receiving, at a remote node, a plurality of traffic flows transmitted from a plurality of radio units in a radio access network of the radio communication network, wherein each radio unit is configured to communicate with one or more user equipment;
   buffering the traffic flows in a common buffer of the remote node; and
   causing a control signal to be sent to a baseband unit when a fill level of the common buffer is predicted to exceed a maximum fill level within a pre-set time interval, wherein the control signal is configured to cause an adjustment of a radio resource allocation used by a particular one of the radio units to communicate with one or more particular user equipment, so as to reduce a data rate of a traffic flow transmitted from the particular radio unit.

2. The method of claim 1, further comprising:
   monitoring a fill level and a fill rate of the common buffer; and
   predicting based on the current fill level and the current fill rate whether the fill level will exceed the maximum fill level within the pre-set time interval.

3. The method of claim 1, wherein:
   causing a control signal to be sent to the baseband unit comprises sending a reallocation request from the remote node to the baseband unit; and
   the reallocation request is configured to cause the adjustment of the radio resource allocation of one of the plurality of radio units.

4. The method of claim 1, further comprising:
   buffering each of the plurality of traffic flows in a respective input buffer and then outputting each of the plurality of traffic flows from the respective input buffer to the common buffer; and
   monitoring a respective fill level of each input buffer and predicting based on a current fill level of each input buffer whether the fill level of the common buffer will exceed the maximum fill level within the pre-set time interval.

5. The method of claim 4, further comprising when the fill level of the common buffer is predicted to exceed the maximum fill level within the pre-set time interval, identifying which of the traffic flows has caused the fill level of the respective input buffer to exceed a preselected threshold fill level, and wherein causing a control signal to be sent to the baseband unit comprises one of the following:

causing a reallocation request to be sent from the remote node to the baseband unit, wherein the reallocation request is configured to cause an adjustment of the radio resource allocation of the radio unit from which the said traffic flow is transmitted; or causing a resource allocation feedback signal to be sent to the radio unit from which the said traffic flow is transmitted, wherein the resource allocation feedback signal is configured to cause the radio unit to adjust a user equipment parameter for negotiating the radio resource allocation of the radio unit at the baseband unit and to cause the radio unit to send a control plane signal comprising an indication of the user equipment parameter to the baseband unit.

6. The method of claim 1, wherein adjusting a radio resource allocation one of the radio units comprises one of the following:

changing a current modulation format used at the radio unit for radio transmission to a modulation format having a lower spectral efficiency; or changing a current number of radio beams used at the radio unit for radio transmission to a lower number of radio beams.

7. The method of claim 1, wherein the plurality of traffic flows include one or more of the following: a low-latency packet interface traffic flow, an Ethernet traffic flow, a common public radio interface traffic flow, and a wireless fidelity traffic flow.

8. A non-transitory, computer-readable medium storing computer-executable instructions that, when executed on at least one processor of a remote node for a radio communications network, configure the remote node to perform operations corresponding to the method of claim 1.

9. A remote node for a radio communications network, the remote node comprising:

a common buffer configured to:

receive a plurality of traffic flows transmitted from a plurality of radio units in a radio access network of the radio communications network, wherein each radio unit is configured to communicate with one or more user equipment, and buffer the plurality of traffic flows; and a radio resource allocation element configured to cause a control signal to be sent to a baseband unit of the radio communications network when a fill level of the common buffer is predicted to exceed a maximum fill level within a pre-set time interval, wherein the control signal is configured to cause an adjustment of a radio resource allocation used by a particular one of the radio units to communicate with one or more particular user equipment, so as to reduce a data rate of a traffic flow transmitted from the particular radio unit.

10. The remote node of claim 9, wherein the radio resource allocation element is further configured to:

monitor a fill level and a fill rate of the common buffer, and predict based on a current fill level and a current fill rate whether the fill level will exceed the maximum fill level within the pre-set time interval.

11. The remote node of claim 9, wherein:

the control signal comprises a reallocation request;

the radio resource allocation element is configured to transmit the reallocation request to the baseband unit; and the reallocation request is configured to cause the adjustment of the radio resource allocation of the particular radio unit.

12. The remote node of claim 9, further comprising a plurality of input buffers configured to:

receive respective ones of the plurality of traffic flows, buffer the plurality of traffic flows, and output the plurality of traffic flows to the common buffer;

and wherein the radio resource allocation element is configured to:

monitor a respective fill level of each input buffer, and predict based on a current fill level of each input buffer whether the fill level of the common buffer will exceed the maximum fill level within the pre-set time interval.

13. The remote node of claim 12, wherein the radio resource allocation element is configured to:

identify which of the traffic flows has caused the fill level of the respective input buffer to exceed a preselected threshold fill level when it has predicted that the fill level of the common buffer will exceed the maximum fill level within the pre-set time interval; and transmit the control signal from the remote node to the baseband unit, wherein the control signal comprises a reallocation request configured to cause an adjustment of the radio resource allocation of the radio unit from which the identified traffic flow is transmitted.

14. The remote node of claim 12, wherein the radio resource allocation element is configured to:

identify which of the traffic flows has caused the fill level of the respective input buffer to exceed a preselected threshold fill level when it has predicted that the fill level of the common buffer will exceed the maximum fill level within the pre-set time interval; and transmit the control signal from the remote node to the radio unit from which the identified traffic flow is transmitted, wherein the control signal comprises a resource allocation feedback signal configured to:

cause the radio unit to adjust a user equipment parameter for negotiating the radio resource allocation of the radio unit at the baseband unit, and cause the radio unit to send a control plane signal comprising an indication of the user equipment parameter to the baseband unit.

15. A radio communications network comprising:

a plurality of radio units configured to transmit a plurality of traffic flows, wherein each radio unit is configured to communicate with one or more user equipment;

the remote node of claim 9; and a baseband unit.

16. Radio resource allocation element configured to control traffic flows in a radio communications network comprising a plurality of radio units, a remote node and a baseband unit, wherein the radio resource allocation element comprises:

processing circuitry configured to:

cause a control signal to be sent to the baseband unit when a fill level of a common buffer of the remote node is predicted to exceed a maximum fill level within a pre-set time interval, wherein:

the common buffer is configured to buffer a plurality of traffic flows received from the plurality of radio units, wherein each radio unit is configured to communicate with one or more user equipment, and the control signal is configured to cause an adjustment of a radio resource allocation used by a particular one of the radio units to communicate with one or more particular user equipment, so as to reduce a data rate of a traffic flow transmitted from the particular radio unit.

* * * * *